United States Patent [19]

Saatchi et al.

[11] Patent Number: 5,271,879
[45] Date of Patent: Dec. 21, 1993

[54] METHOD OF FORMING A HYBRID COMPOSITE SANDWICH STRUCTURE

[75] Inventors: Hossein Saatchi; Kurt A. Smith, both of Rockford, Ill.

[73] Assignee: Sundstrand Corporation, Rockford, Ill.

[21] Appl. No.: 839,121

[22] Filed: Feb. 19, 1992

Related U.S. Application Data

[63] Continuation of Ser. No. 499,024, Mar. 26, 1990, abandoned.

[51] Int. Cl.$^5$ .............................................. B29C 67/22
[52] U.S. Cl. ..................................... 264/46.5; 264/54; 264/257; 264/258; 156/79; 156/309.6
[58] Field of Search ................. 264/60, 258, 257, 45.1, 264/46.5, 54; 156/79, 309.6

[56] References Cited

U.S. PATENT DOCUMENTS 4,073,997 2/1978 Richards et al. ..................... 156/79
4,363,690 12/1982 Gagliani et al. ..................... 156/79
4,413,822 11/1983 Fernandez et al. .................. 264/453

Primary Examiner—Allan R. Kuhns
Attorney, Agent, or Firm—Wood, Phillips, VanSanten, Hoffman & Ertel

[57] ABSTRACT

Current processes for the formation of hybrid composite sandwich structures are expensive, often result in weak unsound products, require time and labor intensive secondary operations and are not readily adaptable for custom design work. These and other problems are solved by a relatively simple and inexpensive process producing hybrid composite sandwiched structures which includes placing core materials 24 sandwiched by multiples layers including at least one ceramic layer 46 or metallic layer 38 and having polymeric films 32, 34, 40, 42 positioned between substantially all the layers in a mold cavity 18. When the contents of the mold cavity 18 are heated to consolidate this structure, the polymeric films 32, 34, 40, 42 melt and act as an adhesive between the layers of the structure formed.

9 Claims, 2 Drawing Sheets

METHOD OF FORMING A HYBRID COMPOSITE SANDWICH STRUCTURE

CROSS-REFERENCE TO RELATED APPLICATION

This is a continuation of pending U.S. Ser. No. 07/499,024 filed Mar. 26, 1990 to Saatchi et al., now abandoned.

FIELD OF THE INVENTION

This invention generally relates to composite structures and more particularly, to a process for an in-situ fabrication of a hybrid composite sandwich structure.

BACKGROUND OF THE INVENTION

Composite structures are fabricated with a core sandwiched between skins which may be laminated layers. The core is generally porous, being made of a honeycomb or structural foam (thermoset, thermoplastic, or non-polymeric) for both favorable weight and strength characteristics. The core may contain various fillers and additives including foaming agents, carbon or glass hollow microspheres or fibers, coupling agents, flame retardants, sound suppression particles, conductive materials and antimicrobia.

The core is normally fabricated or molded to as near final dimensions as possible because the machining of core materials is an expensive, labor intensive process. Further, any dimensional deviation of the core may cause intrusion or extrusion of the bond line at the interface of the core and skins. Intrusion can produce voids and thick bond lines and extrusion may result in an inadequate sandwich structure.

The sandwich structure may include fabrics such as laminated fiber reinforced skins, mats, braids, and woven fabrics, all of which surround the core. It is conventional to use polymer pre-impregnated, commingled carbon or glass matrices so to assist in consolidation and strength of the sandwich structure. These commingled materials are relatively expensive.

Hybrid sandwich structures include at least one high impact layer such as a layer of a metallic or ceramic monolithic or composite skin. Presently there are several military and commercial applications which require hybrid laminated sandwich structures such as armored vehicles, military helmets, aircraft structures and other applications which need shielding from electrical disturbances or which require high thermal conductivity. It is known that a multi-layer metallic and/or ceramic composite sandwich structure having a foam core is most effective to stop penetration by a projectile such as a bullet. When a projectile contacts the structure, the energy is dissipated through the different layers to lessen both the damage and impact to the instrumentality being protected by the sandwich structure.

In the above applications the core and skins are generally made separately and then bonded together. Any other layers including the metallic or ceramic layers are then bonded to the sandwich, normally by an adhesive. Because of the use of adhesives having different thermal and physical properties from the other components or layers of the sandwich structure, the adhesive bond line becomes the weakest section of the component and detachment at the bond lines may cause separation of the sandwich structure when it is subject to thermal or load stresses. The separation of a layer or layers of the sandwich structure may cause severe degradation of the component's performance and in some cases can directly cause the loss of the use of the component completely.

In using an adhesive such as an epoxy, the type of polymeric material used in the sandwich structure is limited as most adhesives cannot withstand high temperatures used for processing high temperature thermoplastics such as polyetheretherketone (PEEK), which has a processing temperature of about 750° F.

The fabrication cost of hybrid structures is prohibitive as the current processes for forming sandwich structures, such as injection molding, having relatively low production rates and are not as easily adaptable for custom design. Further, as described earlier, the current processes require secondary operations such as the machining and grinding of the core and the adhering of layers onto the sandwich structures.

Dealing with the fabrication process of sandwich structures is expensive. Indeed according to one estimate related in composite manufacture for use in helicopter fuselages, fabrication accounts for approximately 60% of fuselage formation costs with the remaining 40% being relatively equally divided between the cost of materials, quality assurance and assembly. Reduction of the costs associated with any of those items would be advantageous.

The present invention is directed to overcoming one or more of the above problems.

SUMMARY OF THE INVENTION

It is an object of this invention to provide a new and improved method for fabricating hybrid composite sandwich structures in a one-step in-situ fabrication which will avoid the problems previously described.

It is also an object of the invention to provide a process which will avoid the use of expensive commingled or preimpregnated skins while still providing their advantageous properties.

It is another object of the invention to produce a sandwich structure having multiple laminations without the use of epoxies normally employed, thereby avoiding the associated problems with their use.

Another object is to provide a process which will allow for relatively high production rates as compared to current methods, which include injection molding. Further, the process is such that custom designed hybrid sandwich structures are more easily manufactured than by current methods.

The objects of the invention are achieved in a process which includes providing a mold having a cavity containing core materials sandwiched by multiple layers of materials. The layers of materials include continuous ceramic and/or metallic layers, commingled skins and positioned between these layers are polymeric films. The contents of the mold cavity are heated so as to consolidate the structure and to melt the polymeric films. The film materials act as an adhesive between the multiple layers to form a multiple layer laminated structure.

In another embodiment, the core materials include a raw polymer with a melting point temperature substantially equal to or greater than the melting point temperature of the polymer in the films.

In a preferred embodiment of the invention the process uses dry fabric instead of commingled materials and during the one-step heating cycle the dry fabric is impregnated with the polymer that is used as the adhesive.

In another preferred embodiment the necessary pressure for consolidation and bonding of the layers can be provided by the transformation of foaming agents contained in the core materials to gas.

Other objects and advantages will become apparent from the following description and the accompanying drawings.

DESCRIPTION OF THE PREFERRED EMBODIMENT

The invention relates to the manufacture of hybrid composite sandwich structures suitable for use in varied environments which require fairly precise shapes and high strength coupled with low weight.

Figure 1:
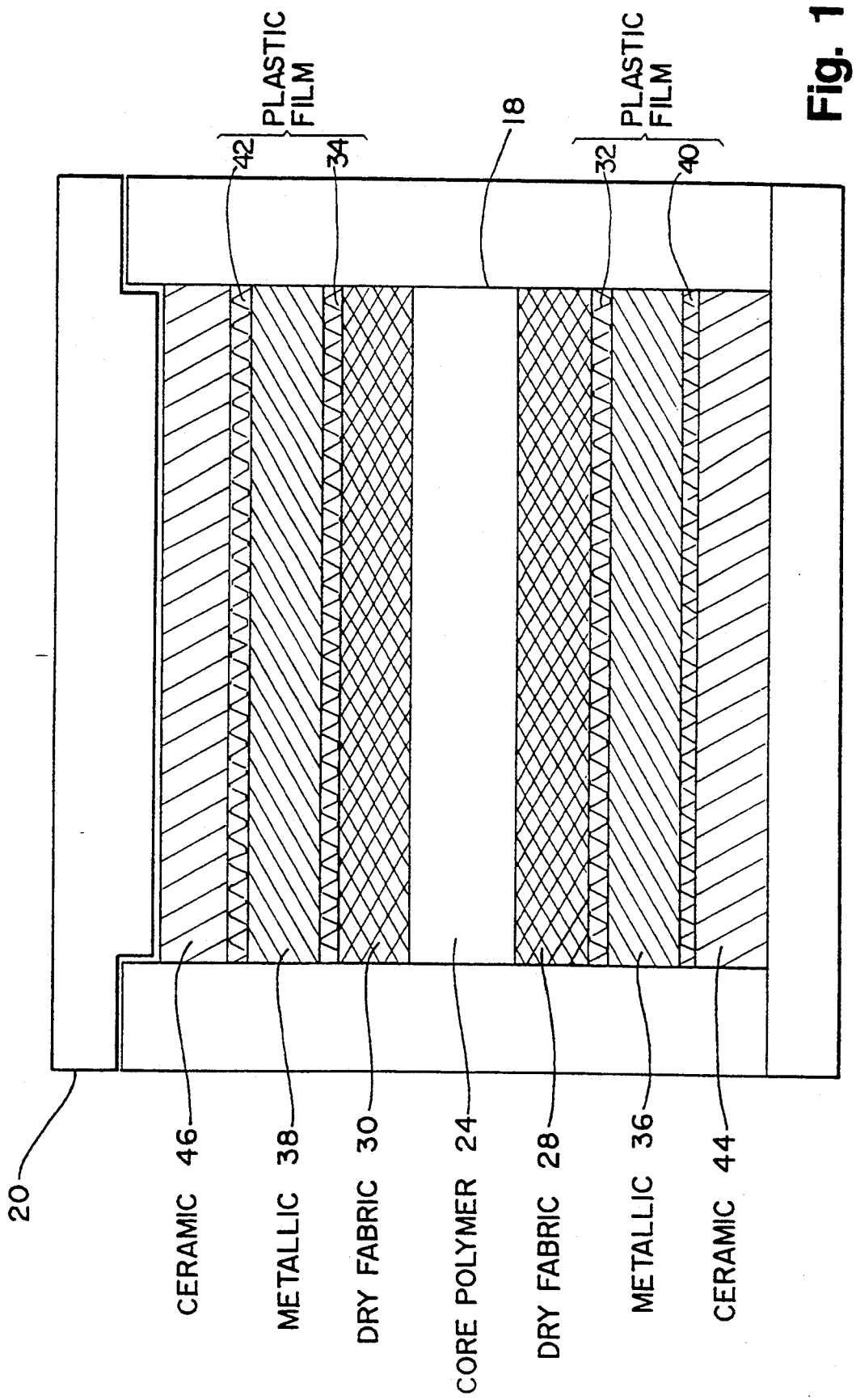
FIG. 1 is a schematic of a mold and its contents for forming a hybrid composite structure.

Turning now to the drawings, FIG. 1 illustrates the cavity 18 of an in-situ fabrication mold 20 filled with the materials 24 which are used to form a hybrid sandwich structure. The core materials 24 are sandwiched between the other layers and include at least one raw polymer as, in this embodiment, polyetheretherketone, which has a processing temperature of about 750° F., although other polymers may be used. Fillers and reinforcers such as graphite fiber and/or glass microspheres may be used in the core materials 24 and the core materials 24 are substantially homogeneous to provide desired characteristics. The core materials 24 may also be prefabricated.

To provide density reduction of the finished structure and internal pressure for consolidation and, as described later, for assisting in the impregnation of dry fabrics with polymer, a foaming agent is included. Preferably, the foaming agent will not appreciably generate gas required until the polymer in the core materials 24 has reached a temperature in excess of its melting point. When using polyetheretherketone or other high temperature polymers, sodium borohydride may desirably be used. Sodium borohydride will not react chemically with any dry materials employed, and will begin to thermally decompose, thereby generating molecular hydrogen, only at temperatures on the order of 730° F.

Next comes dry fabrics 28, 30 that are positioned in abutment with the core materials 24.

The next layers out are polyetheretherketone thermoplastic films 32, 34. The films 32, 34 allow the molecular bonding of the multiple laminations of the structure formed in this in-situ fabrication mold 20. While the polymer used in the films 32, 34 is not limited to polyetheretherketone, the melt temperature of the films 32, 34 should be equal to or lower than the melt temperature of the core material's polymer. The thermoplastic films' placement in abutment with the dry fabrics 28, 30 will also provide the necessary polymer for impregnation of the dry fabrics 28, 30 during consolidation.

The following outer layers are metallic layers 36, 38. The metallic layers 36, 38 will provide energy dissipation layers in cases of the structure being hit with a projectile.

The next layers are additional polyetheretherketone thermoplastic films 40, 42 followed by ceramic layers 44, 46. It should be understood that the order of the metallic, ceramic and dry fabric layers is not limited to this embodiment. It should be also understood that further layers can be added and that the number of layers in this embodiment in not exhaustive.

The ceramic and metallic layers may be monolithic or composite in form and are continuous in that no perforations extend through the ceramic or metallic layers. Examples of ceramic materials include alumina, silica, silicon carbide and silicon nitride. Examples of metallic materials include aluminum, titanium and magnesium. Both the ceramic and metallic layers are considered high impact or energy dissipation layers. The ceramic layers 44, 46 will shatter when a projectile impacts upon them, thereby absorbing energy and slowing the velocity of the projectile. The metallic layers 36, 38 will also absorb energy and, further, prohibit further penetration by the projectile.

Figure 2:
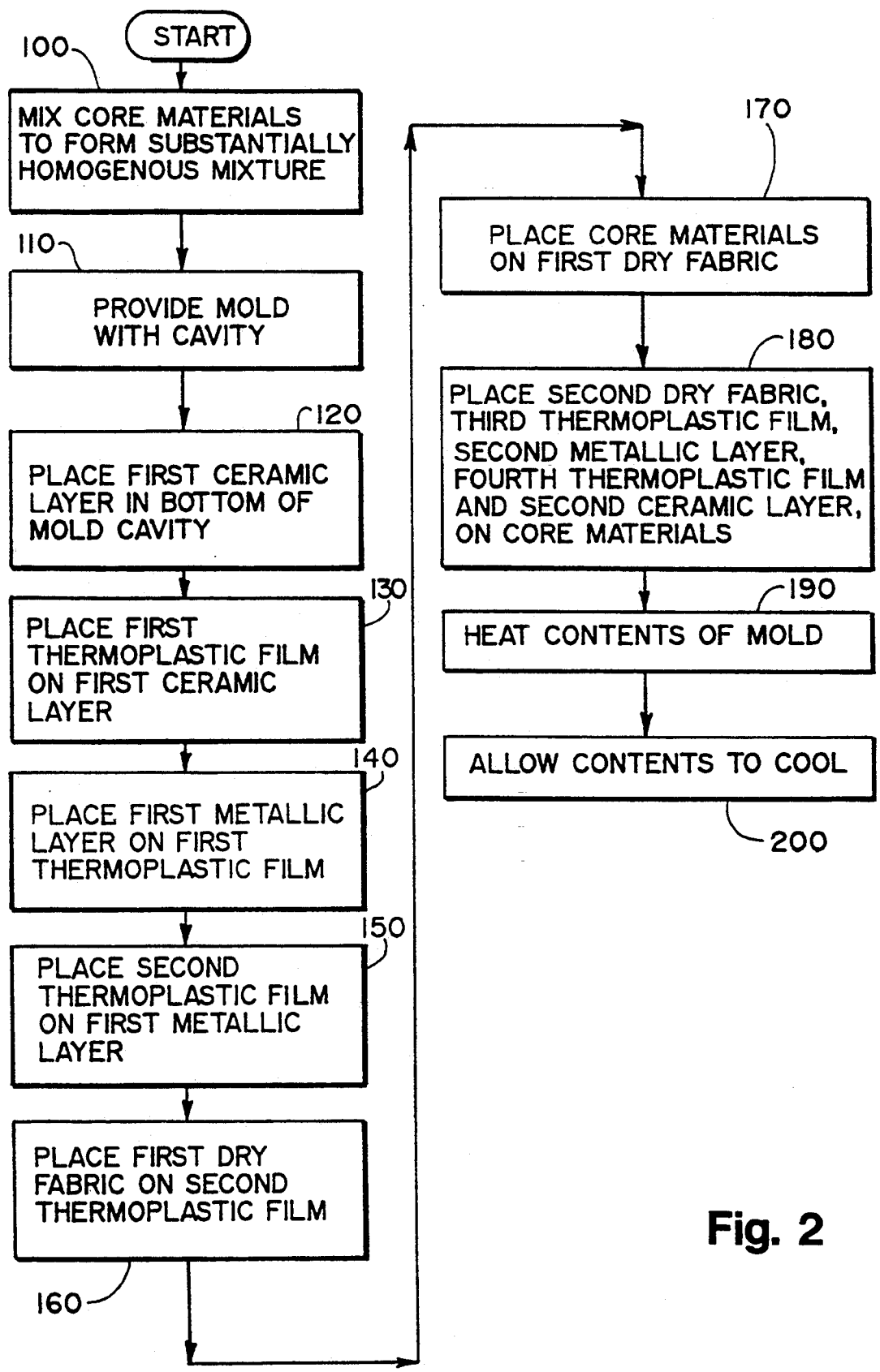
FIG. 2 is a block diagram indicating the use of this process in forming a hybrid sandwich structure.

In come cases where a layer of material with a lesser melting point temperature is to be bonded to the sandwich structure, it is possible to fabricate the component using a polymeric film having a lower melting point temperature as the adhesive. In that case, a core may be pre-fabricated and commingled skins and/or polymeric films having components with lower melting point temperatures be used to form the sandwich structure. For example, polyetherimide or polyphenylene sulfide films have processing temperatures approximately 100° F. to 150° F. lower than the processing temperature for polyetheretherketone In the preferred embodiment of the process in forming a hybrid sandwich structure, as shown in FIG. 2, the first step 100 is to mix the core materials 24 together thoroughly to form a substantially homogeneous mixture. As earlier stated, the core materials 24 will include a raw polymer, in this case polyetheretherketone, and may also include any number of additives, reinforcers and/or blowing agents. In the preferred embodiment, a blowing or foaming agent will be used to assist in consolidation of the structure and impregnation of the dry fabrics 28, 30.

The next step 110 is to provide the mold 20 having the cavity 18. The mold 20 should be of a design which will allow placement of all required materials therein for a one-step heating cycle in-situ fabrication and will also result in a near net shaped structure so that secondary operations may be avoided or minimized.

A first ceramic layer 44 is then placed, as step 120, in the bottom of the cavity 18 of the mold 20. A first polyetheretherketone thermoplastic film 40 is placed, as step 130, on top of the ceramic layer 44. In this example polyetheretherketone film is used as it is the same as the polymer used in the core materials 24. It should be understood, however, that using the same base polymer in the film and the core is not a requirement. The polymeric films, which will be used to adhere the multiple layers and for impregnating dry fabric should have a melting point temperature around or less than the core material's polymer's melting point temperature.

Thereafter, as step 140, a first metallic layer 36 is placed on the polyetheretherketone film 40. Another polyetheretherketone thermoplastic film 32 is placed on the metallic layer 36 and a dry fabric 28 is placed on the second thermoplastic film 32 as steps 150 and 160. As the next step 170, the core materials 24 are then placed in the cavity 18 of the mold 20 and on top of the dry fabric 28.

The next step 180 is to place a second dry fabric 30, a third thermoplastic film 34, a second metallic layer 38, a fourth thermoplastic film 42, and a second ceramic layer 46, in order, on the core materials 24.

The contents of the mold 20 are then subjected to a heating step 190 so that the core's polymer and films 32, 34, 40, 42, melt, thereby consolidating the structure, impregnating the dry fabrics 28, 30 and causing the foaming agent in the core materials 24 to decompose to produce internal pressure to assist in the consolidation of the structure and impregnation of the fabrics 28, 30. For polyetheretherketone, the processing temperature is approximately 750° F. Finally, the mold's contents are then allowed to cool, as step 200.

This process results in a structure having strong interlayer bonds by avoiding the use of adhesives such as epoxies. In the preferred embodiment, a one resin system is used so that the characteristics of the structure will be more uniform.

The core of the structure, which may be a foamed core, may be fabricated prior to the process, and inserted into the mold 20, instead of the raw core materials 24.

The one-step consolidation is superior to other processes as there are no or at least minimal secondary operations necessary after the one-step in-situ fabrication or, in other words, the structure formed is characterized by an absence of any requirement for any substantial secondary operations. Further, this process allows for a higher production rate as the formed structure may be removed from the mold and the process begun again immediately thereafter. Also, the process allows for the easier custom design of structures, as the cavity 18 of the mold 20 may be designed for forming complex shaped structures. The process also results in savings in avoiding the use of expensive commingled fabrics in that dry fabrics can be impregnated during the one-step in-situ fabrication.

What is claimed is:

1. A process for the in-situ fabrication of a hybrid composite sandwiched structure comprising the steps of:
    placing core materials sandwiched by multiple layers including at least one continuous ceramic or metallic layer and having polymeric films positioned between the layers in a mold cavity, said core materials comprising at least one raw polymer and a foaming agent, said continuous layer lacking perforations, said polymeric film layers formed of a polymer having a melting point temperature below or near said melting point temperature of said raw polymer;
    heating the contents of said mold cavity at an elevated temperature for a sufficient time to melt said raw core polymer and said polymeric film layers and decompose said foaming agent to generate gas so that said multiple layers are contacted with molten polymer from said film; and
    allowing the contents of said mold cavity to cool so that the layers are bonded together as the molten polymer solidifies.

2. The process as recited in claim 1 wherein the core polymer and the polymer in said polymeric film layers are the same.

3. The process as recited in claim 1 wherein said multiple layers also include at least one dry fabric in abutment with a polymeric film layer such that during the step of heating the dry fabric is impregnated with the polymer from said polymeric film layer.

4. A process for the one step in-situ fabrication of a hybrid composite sandwich structure comprising the steps of:
    placing core materials sandwiched by multiple layers including at least one continuous ceramic or metallic layer and at least one dry fabric layer and having polymeric films positioned between substantially all of the layers in a mold cavity, said core materials comprising a raw polymer and a foaming agent, said polymeric film layers comprising the same polymer as present in said core materials;
    heating the contents of the mold cavity at an elevated temperature for a time sufficient to melt the raw polymer and said polymeric film layers to impregnate said dry fabric layer with polymer from said polymeric film layers, to decompose said foaming agent to generate gas to assist in consolidation of said structure and impregnation of said dry fabric, and to contact said multiple layers with said molten polymer from said polymeric film layers; and
    allowing the contents of said mold cavity to cool so that the layers are bonded together as the molten polymer from the polymeric film layers solidifies.

5. The processes as recited in claim 4 where said polymeric film layers comprise polyetheretherketone.

6. The process as recited in claim 5 wherein said step of heating takes place at a temperature of about 750° F.

7. The process as recited in claim 6 wherein said foaming agent is sodium borohydride.

8. The process as recited in claim 4 wherein said dry fabric is a carbon matrix.

9. The process as recited in claim 4 further comprising the step of removing the structure from said mold cavity, said structure characterized by an absence of any requirement for any substantial secondary operations.

* * * * *